(12) United States Patent
Bonissone et al.

(10) Patent No.: US 7,509,235 B2
(45) Date of Patent: Mar. 24, 2009

(54) METHOD AND SYSTEM FOR FORECASTING RELIABILITY OF ASSETS

(75) Inventors: Piero Patrone Bonissone, Schenectady, NY (US); Kareem Sherif Aggour, Niskayuna, NY (US); Anil Varma, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 330 days.

(21) Appl. No.: 11/216,940

(22) Filed: Aug. 31, 2005

(65) Prior Publication Data

US 2007/0061232 A1 Mar. 15, 2007

(51) Int. Cl.
*G06F 11/30* (2006.01)
(52) U.S. Cl. .......................... 702/184; 702/181; 702/34
(58) Field of Classification Search ............. 702/33–35, 702/81–84, 177, 179–184; 700/79–81; 714/1, 714/47
See application file for complete search history.

(56) References Cited

U.S. PATENT DOCUMENTS

| | | | | |
|---|---|---|---|---|
| 4,336,595 | A * | 6/1982 | Adams et al. ................. | 702/34 |
| 4,719,587 | A * | 1/1988 | Berte ........................... | 702/34 |
| 6,564,213 | B1 * | 5/2003 | Ortega et al. .................. | 707/5 |
| 6,567,752 | B2 | 5/2003 | Cusumano et al. | |
| 6,847,854 | B2 | 1/2005 | Discenzo | |
| 7,103,509 | B2 | 9/2006 | Shah et al. | |
| 7,181,364 | B2 * | 2/2007 | Lancaster et al. ............ | 702/182 |
| 2002/0019826 | A1 * | 2/2002 | Tan ............................. | 707/102 |
| 2002/0128751 | A1 * | 9/2002 | Engstrom et al. ............... | 701/1 |
| 2003/0158803 | A1 * | 8/2003 | Darken et al. ................. | 705/36 |
| 2003/0184307 | A1 | 10/2003 | Kozlowski et al. | |
| 2003/0187701 | A1 | 10/2003 | Bonissone et al. | |
| 2003/0187702 | A1 | 10/2003 | Bonissone et al. | |
| 2004/0039499 | A1 * | 2/2004 | Felke et al. ................... | 701/29 |
| 2004/0210545 | A1 * | 10/2004 | Branke et al. ................. | 706/45 |
| 2006/0247798 | A1 | 11/2006 | Subbu et al. | |
| 2007/0088550 | A1 | 4/2007 | Filev et al. | |

OTHER PUBLICATIONS

Article entitled "Predicting the Best Units within a Fleet: Prognostic Capabilities Enabled by Peer Learning, Fuzzy Similarity, and Evolutionary Design Process" published in the Proceedings of 2005 IEEE International Conference on Fuzzy Systems (FUZZ-IEEE'05); May 22-25, 2005.

K. Aggour et al., "Selecting the Best Units in a Fleet: Prediction from Equipment Peers," Proc. 7th Int. Conference on Case-Based Reasoning (ICCBR) 2005, Chicago, IL, Aug. 23-26.

(Continued)

*Primary Examiner*—Manuel L Barbee
(74) *Attorney, Agent, or Firm*—Scott J. Asmus

(57) ABSTRACT

A method and system of forecasting reliability of an asset is provided. The method includes identifying peer units of the asset by using selected criteria, performing a search for the peer units based upon the selected criteria, and constructing local predictive models using the peer units. The method also includes estimating the future behavior of the asset based upon the local predictive models and dynamically updating the local predictive models to reflect at least one change in the criteria.

20 Claims, 8 Drawing Sheets

OTHER PUBLICATIONS

P. Bonissone et al., "An Evolutionary Process for Designing and Maintaining a Fuzzy Instance-based Model (FIM)," Proc. First workshop of Genetic Fuzzy Systems (GFS 2005), Granada Spain, Mar. 17-19.

P. Bonissone, "The life cycle of a fuzzy knowledge-based classifier," Proc. North American Fuzzy Information Processing Society (NAFIPS 2003), Chicago, IL, Aug. 2003, pp. 488-494.

P. Bonissone et al., "Evolutionary Optimization of Fuzzy Decision Systems for Automated Insurance Underwriting," Proc. FUZZ-IEEE 2002, Honolulu, HI, May 2002, pp. 1003-1008.

K. Aggour et al., "SOFT-CBR: A self optimizing fuzzy tool for case-based reasoning," Proc. 5th Int. Conference on Case-Based Reasoning (ICCBR) 2003, Lecture Notes in Artificial Intelligence, Trondheim, Norway, 2003, pp. 5-19.

A. Patterson et al., "Six Sigma Quality Applied Throughout the Lifecycle of an Automated Decision System," Journal of Qualilty and Reliability Engineering International, Apr. 21, 2005, pp. 275-292.

P. Bonissone et al., "Design of local fuzzy models using evolutionary algorithms," Computational Statistics and Data Analysis, 51, 2006, pp. 398-416.

K. Aggour et al., "Automating the Underwriting of Insurance Applications," AI Magazine, 27, Fall 2006, pp. 36-50.

Piero P. Bonissone et al., "System and Method for Equipment Remaining Life Estimation, " U.S. Appl. No. 11/608,058, filed Dec. 7, 2006, General Electric.

Kai F. Gobel et al., "System and Method for Equipment Life Estimation," U.S. Appl. No. 11/608,076, filed Dec. 7, 2006, General Electric.

* cited by examiner

METHOD AND SYSTEM FOR FORECASTING RELIABILITY OF ASSETS

STATEMENT REGARDING FEDERALLY SPONSORED RESEARCH AND DEVELOPMENT

The U.S. Government may have certain rights in this invention pursuant to contract number 621-004-S-0031 awarded by the Defense Advanced Research Projects Agency (DARPA) of the Department of Defense (DoD).

BACKGROUND

The present disclosure relates generally to asset reliability forecasting and, in particular, to asset reliability forecasting and event-based asset selection.

Selecting the most appropriate assets for use in an operation requires some degree of knowledge of the individual units of a particular group of assets, such as age, service/maintenance history, etc. For example, given a fleet of commercial trucks it may be useful to know each vehicle's repair history before determining which vehicle should be assigned to a particular operation. In this example, a newer truck that has had minimal repair issues may be chosen for a cross-country operation, while an older truck with a less-than-optimal repair record may be selected for an intra-state operation. Other information that may be useful in the selection process includes logistical information (e.g., the current location of a vehicle with respect to the starting point and destination of the operation), the sensitivity of the operation (e.g., valuable, fragile, or perishable cargo), environmental considerations (e.g., extreme heat, rough terrain), and time-sensitive considerations, to name a few.

For large groups of assets, these determinations can become complex and fraught with error. Moreover, for particular types of assets and operations, the various information elements used in making these determinations oftentimes change dynamically over time, making the asset selection process even more uncertain.

What is needed, therefore, is a way to identify and select the most appropriate assets for operations or events and to predict future performance of the assets based upon changing criteria over time.

BRIEF SUMMARY

Exemplary embodiments include a method and system of forecasting reliability of an asset is provided. The method includes identifying peer units of the asset by using selected criteria, performing a search for the peer units based upon the selected criteria, and constructing local predictive models using the peer units. The method also includes estimating the future behavior of the asset based upon the local predictive models and dynamically updating the local predictive models to reflect at least one change in the criteria.

The system includes a host system and a storage device in communication with the host system. The storage device stores asset data. The system also includes an asset integrity engine executing on the host system. The asset integrity engine performs a method. The method includes identifying peer units of the asset by using selected criteria, performing a search for the peer units based upon the selected criteria, and constructing local predictive models using the peer units. The method also includes estimating the future behavior of the asset based upon the local predictive models and dynamically updating the local predictive models to reflect at least one change in the criteria.

BRIEF DESCRIPTION OF THE DRAWINGS

Referring to the exemplary drawings wherein like elements are numbered alike in the accompanying FIGURES.

DETAILED DESCRIPTION OF THE EMBODIMENTS

In accordance with exemplary embodiments, asset reliability forecasting processes provide the ability to select the most reliable units, or assets, within a group of assets by formulating it as a classification and prediction problem. The prediction of each unit's remaining life is based on the identification of "peer" units, i.e., assets with similar utilization and maintenance records that are expected to behave similarly to the unit under consideration. With these peers, local predictive models are constructed for estimating the unit's remaining life. Evolutionary algorithms (EAs) may be used to develop the criteria for defining peers and the relevance of each criterion in evaluating similarity with the unit. Each individual in the EA's population characterizes an instance-based fuzzy model that is used to predict the unit's remaining life. The precision of the selection of units with best-expected life provides the fitness value.

The asset reliability forecasting processes may be applicable to any type of device or apparatus (e.g., electromechanical systems), such as commercial vehicles (e.g., passenger jets, cargo vehicles), military vehicles (e.g., tanks, jet fighters, ships and submarines, etc.). It should be noted that the fleet need not be limited to mobile assets, and therefore it could be a "fleet" of medical imaging equipment (e.g., CT and MRI scanners, XR machines), or any other suitable system. The assets are described herein with respect to vehicles of a fleet.

The concept of similarity in determining asset reliability is dynamic over time. The reliability of an asset, as described herein, is evaluated in terms of the mission or operation at hand. For example, given a mission that has a set of requirements (e.g., time or duration, hazardous environmental conditions, number of assets needed, etc.), what percentage of assets assigned to that mission will be able to complete the mission without encountering a critical failure. This reliability determination is complicated by factors (e.g., a new type of operation is employed or new equipment platforms are introduced to the asset fleet and insufficient data exists on how the assets will behave in that environment).

Figure 1:
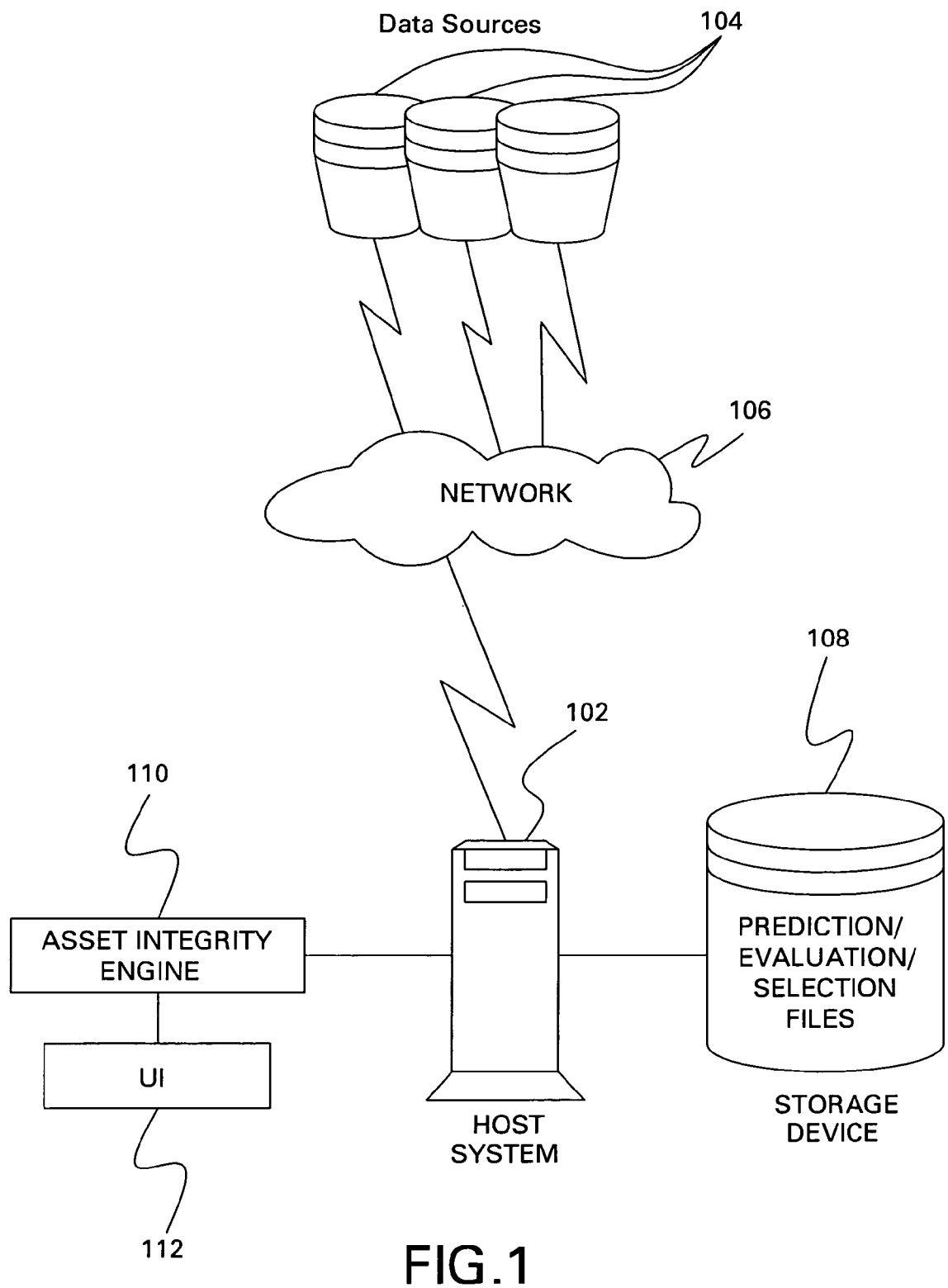
FIG. 1 is a system upon which the asset reliability forecasting processes may be implemented in exemplary embodiments.

Turning now to FIG. 1, a system upon which the asset reliability forecasting processes may be implemented will now be described. The system of FIG. 1 includes a host system 102 in communication with one or more data sources 104 over a network 106 and storage device 108.

Host system 102 may be implemented using one or more servers or suitable high-speed processors operating in response to a computer program stored in a storage medium accessible by the server or servers. The host system 102 may operate as a network server (e.g., a web server) to communicate with network entities such as data sources 104. The host system 102 may handle sending and receiving information to and from network entities, e.g., data sources 104 and may perform associated tasks.

Host system 102 may also operate as an application server. In accordance with exemplary embodiments, the host system 102 executes one or more computer programs to perform asset reliability forecasting processes. These one or more computer programs are referred to collectively herein as an asset integrity engine 110.

As previously described, it is understood that separate servers may be utilized to implement the network server functions and the application server functions of host system 102. Alternatively, the network server and the application server may be implemented by a single server executing computer programs to perform the requisite functions described with respect to host system 102.

The asset integrity engine 110 may include a user interface (UI) 112 for enabling individuals to perform activities, such as configuring the asset feature information, similarity parameters, and weighting parameters.

Storage device 108 may be implemented using a variety of devices for storing electronic information. It is understood that the storage device 108 may be implemented using memory contained in the host system 102, or it may be a separate physical device. The storage device 108 is logically addressable as a consolidated data source across a distributed environment that includes network 106. Information stored in the storage device 108 may be retrieved and manipulated via the host system 102. In an exemplary embodiment, the host system 102 operates as a database server and coordinates access to application data including data stored on storage device 108.

Storage device 108 stores a variety of information and content relating to assets of the entity implementing the asset reliability forecasting processes. Examples of the types of information stored in storage device 108 and managed by the asset integrity engine 110 may include asset prediction files, asset evaluation and performance files, and asset selection files. One or more databases may be utilized for organizing this information. For example, the organization or entity of host system 102 may maintain database records for each of its assets which provide, e.g., maintenance, repair, and utilization information, etc.

The asset integrity engine 110 may access information available from external data sources 104 and utilize this information in generating and providing asset reliability predictions and performance information to requesting individuals. External data sources 104 refer to sources of information that are external to the host system 102, and may be provided by a third party. The external data sources 104 may be implemented using one or more servers operating in response to a computer program stored therein or in a storage medium accessible by the server or servers (e.g., in a manner similar to that described above with respect to host system 102).

The data sources 104 are used to train the model and validate the results of testing. Sources of data may include design and engineering data (e.g., model, configuration, date of manufacture, date of service, upgrades, software modifications, etc.), recommendation data from remote monitoring and diagnostics services (e.g., time-stamped records of when abnormal patterns in the fault data were detected, leading to a recommendation issued by monitoring service entity), maintenance data from repair shops (e.g., repair actions that successfully fixed the problem), utilization data from an entity utilizing the assets (odometer miles, megawatt-hours, hours spent motoring, cumulative engine hours, percentage of time spent in each gear setting, etc.), and other relevant data sources.

Network 106 may be any type of known network including, but not limited to, a local area network (LAN), a wide area network (WAN), a global network (e.g. the Internet), a private network (e.g. an Intranet), and a virtual private network (VPN). The network 106 may be implemented using a wireless network or any kind of physical network implementation known in the art. Network entities (e.g., external data sources 104), may be coupled to the host system 102 through multiple networks (e.g., intranet and Internet) so that not all network entities are coupled to the host system 102 through the same network. One or more of the network entities and the host system 102 may be connected to the network 106 in a wireless fashion.

Figure 2:
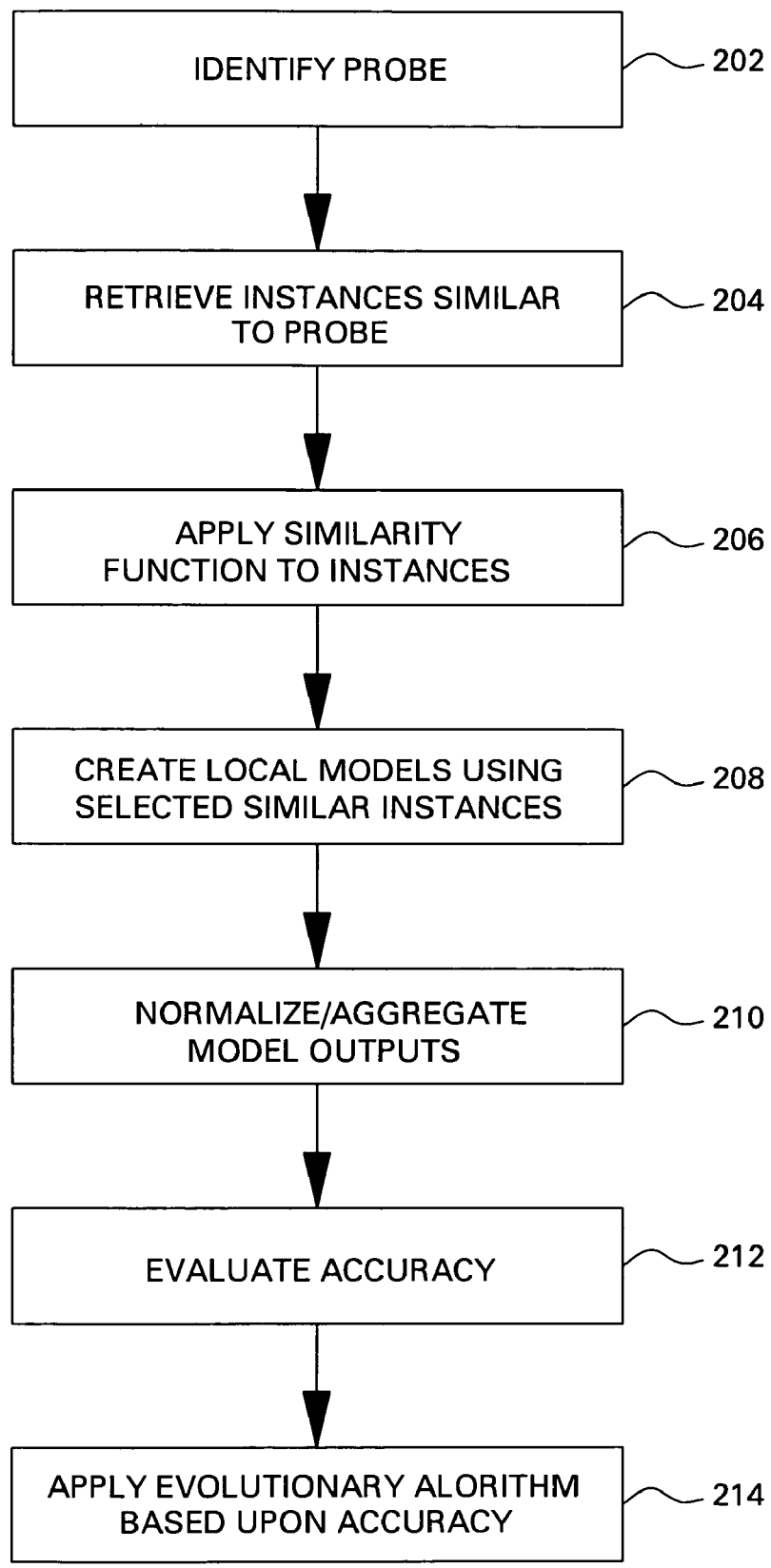
FIG. 2 is a flow diagram illustrating a process for implementing the asset reliability forecasting processes in exemplary embodiments.

Turning now to FIG. 2, a flow diagram describing a process for implementing the asset reliability forecasting processes in exemplary embodiments will now be described.

Figure 3:
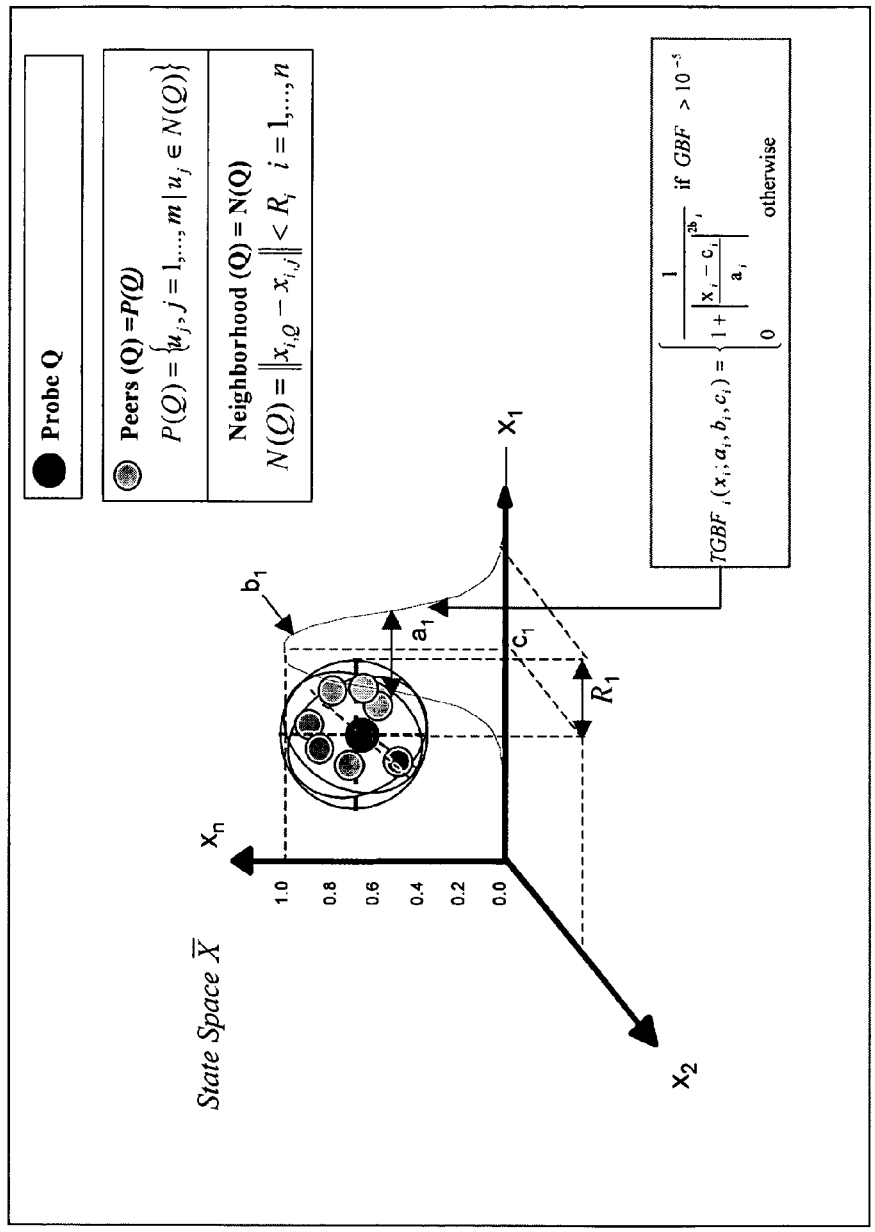
FIG. 3 is a graphical depiction of a state space for a cluster of potential peers associated with a selected probe in exemplary embodiments.

At step 202, a probe, or query, is identified. At step 204, a search and retrieval of one or more data sources 104 is performed. This includes finding all database instances whose behavior is similar to the probe. The instances reflect the probe's potential peers (e.g., as points in an n-dimensional feature space). A probe Q has an associated n-dimensional vector of values for each potential attribute. A similar n-dimensional vector characterizes each unit $u_i$ in the group. Furthermore, each unit has an attached vector $O(u_i)=[D_{1,i}, D_{2,i}, \ldots, D_{k(i),i}]$ containing its historic operational availability durations: $u_i=[x_{1,i}, x_{2,i}, \ldots, x_{n,i}]$; $O(u_i)=[D_{1,i}, D_{2,i}, \ldots, D_{k(i),i}]$. For each dimension i, a Truncated Generalized Bell Function, $TGBF_i(x_i; a_i, b_i, c_i)$, centered at the value of the probe $c_i$, which represents the degree of similarity along dimension i, as shown in FIG. 2. Since the parameters $c_i$ in each $TGBF_i$ are determined by the values of the problem, each $TGBF_i$ has only two free parameters, $a_i$ and $b_i$, to control its spread and curvature, or slope. In the retrieval step, an instance is extracted from the database if all of its features are within the support of the TGBFs. Thus, the retrieval step may be formalized. P(Q), the set of potential peers of Q to be retrieved, is composed of all units within a range from the value of $\{u_j, j=1, \ldots, m | u_j \in N(Q)\}$ and N(Q), a neighborhood of Q, is defined by the constraint $\|x_{i,Q}-x_{i,j}\|<R_i$ for all potential attributes i for which their corresponding weight is non-zero. $R_i$ is half of the support of the $TGBF_i$, centered on the probe's coordinate $x_{i,Q}$. A graphical depiction of a state space 300 for a cluster of potential peers associated with a selected probe is shown in FIG. 3.

At step 206, a similarity function is applied to the instances retrieved at step 204. The similarity function is a dynamic concept that may frequently change over time. Each $TGBF_i$ is a membership function representing the degree of satisfaction of constraint $A_i(x_i)$. Thus, $TGBF_i$ measures the closeness of an instance around the probe value $X_{i,Q}$ along the $i^{th}$ attribute. For a potential peer $P_j$, we evaluate $S_{ij}=TGBF(x_{ij}; a_i, b_i, x_{i,Q})$, its similarity with the probe Q along each attribute i. The values $(a_i, b_i)$ may be design choices initially selected manually, and later determined by an evolutionary algorithm. In order to find the most similar instances that are closest to the probe along all n attributes, a similarity measure defined as the intersection (minimum) of the constraint-satisfaction values is used:

$$S_j = \underset{i=1}{\text{Min}}^{n} \{S_{i,j}\} = \underset{i=1}{\text{Min}}^{n} \{TGBF(\chi_{i,l}; a_i, b_i, \chi_{i,Q})\}.$$

Figure 4:
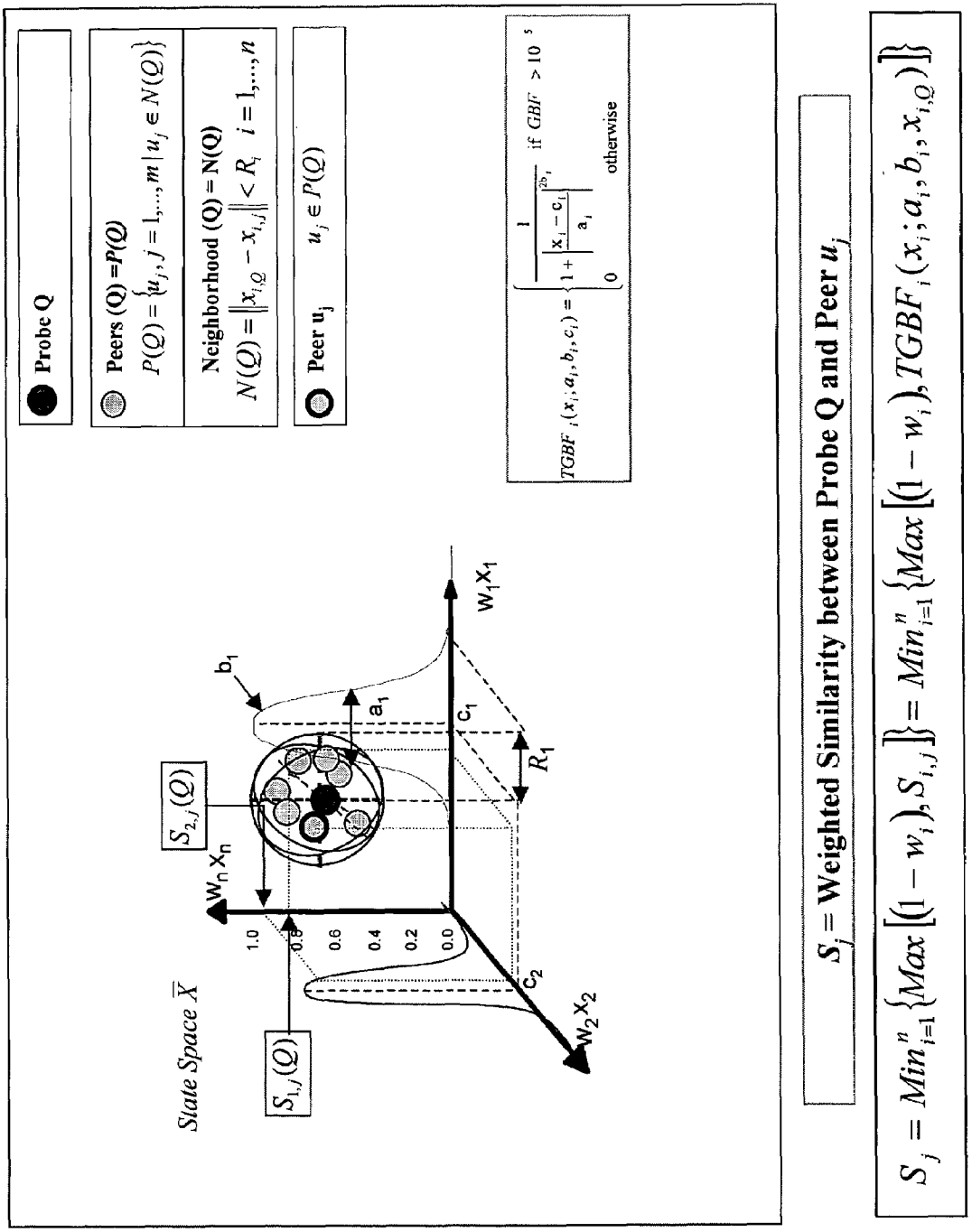
FIG. 4 is a graphical depiction of a state space for a cluster of potential peers associated with a selected probe after applying a similarity function in exemplary embodiments.

This equation implies that each attribute or feature is equally important in computing similarity. In order to consider each criterion to have a different relevance in that computation, a weight $w_i$ may be attached to each attribute $A_i$ and the similarity measure is extended between $P_j$ and the probe Q using a weighted minimum operator:

$$S_j = \underset{i=1}{\text{Min}}^{n} \{\text{Max}[(1-w_i), S_{j,i}]\}$$

$$= \underset{i=1}{\text{Min}}^{n} \{\text{Max}[(1-w_i), TGBF(\chi_l; a_i, b_i, \chi_{i,Q})]\}$$

where $w_i \in [0,1]$. The set of values for the weights $\{w_i\}$ and of the parameters $\{(a_i, b_i)\}$ are important design choices that impact the proper selection of peers. Initially, they may be selected manually. Subsequently, they may be derived using evolutionary search techniques as described further herein. A graphical depiction of a state space 400 for a cluster of potential peers associated with a selected probe after applying a similarity function is shown in FIG. 4.

Using the selected similar instances, local predictive models are created for forecasting each unit's (asset's) remaining life at step 208. Each local model is used to generate an estimated value of the predicted variable y. For example, assume that for a given probe Q, a number of peers m have been retrieved, $P_j(Q)$, j=1, . . . , m. Each peer $P_j(Q)$ has a similarity measure $S_j$ with the probe. Furthermore, each peer $P_j$ has a track record of operational availability between failures $O(P_j)=[D_{1,j}, D_{2,j}, \ldots, D_{k(j),j}]$. Each peer $P_j(Q)$ will have k(j) availability pulses in its track history. For each peer $P_j$, the duration of the next availability duration $y_j=D_{k(j)+1,j}$ is sought. The prediction of all peers $\{D_{k(j)+1,j}\}$ (j=1, . . . , m) is combined to estimate the availability duration $y_Q$ for the probe Q. The next availability duration $D_{k(j)+1,j}$ from the operational availability vector $O(P_j)=[D_{1,j}, D_{2,j}, \ldots, D_{k(j),j}]$ by using an exponential average $\alpha$ that gives relevance to the most recent information, namely:

$$Y_j = D_{k(j)+1,j} = \overline{D}_{k(j),j}$$

$$= \alpha \times D_{k(j),j} + (1-\alpha) \times \overline{D}_{k(j)-1,j} [\text{where } \overline{D}_{1,j} = D_{1,j}]$$

$$= (1-\alpha)^{k(j)-1} D_{1,j} + \sum_{t=2}^{k(j)} (1-\alpha)^{k(j)-t} \times \alpha \times D_{t,j}$$

At step 210, the model outputs are normalized and aggregated in order to determine a final output. The individual predictions $\{D_{k(j)+1,j}\}$ (j=1, . . . , m) of the peers $P_j(Q)$ are combined to generate the prediction of the next availability duration, $D_{next,Q}$ for the probe Q. This aggregation is referred to herein as the similarity weighted average and may be determined by computing the weighted average of the peers' individual predictions using their normalized similarity to the probe as a weight:

$$Y_Q = D_{Next,Q} = \frac{\sum_{j=1}^{m} S_j \times Y_j}{\sum_{j=1}^{m} S_j} \text{ where } y_j = D_{k(j)+1,j}.$$

Figure 5:
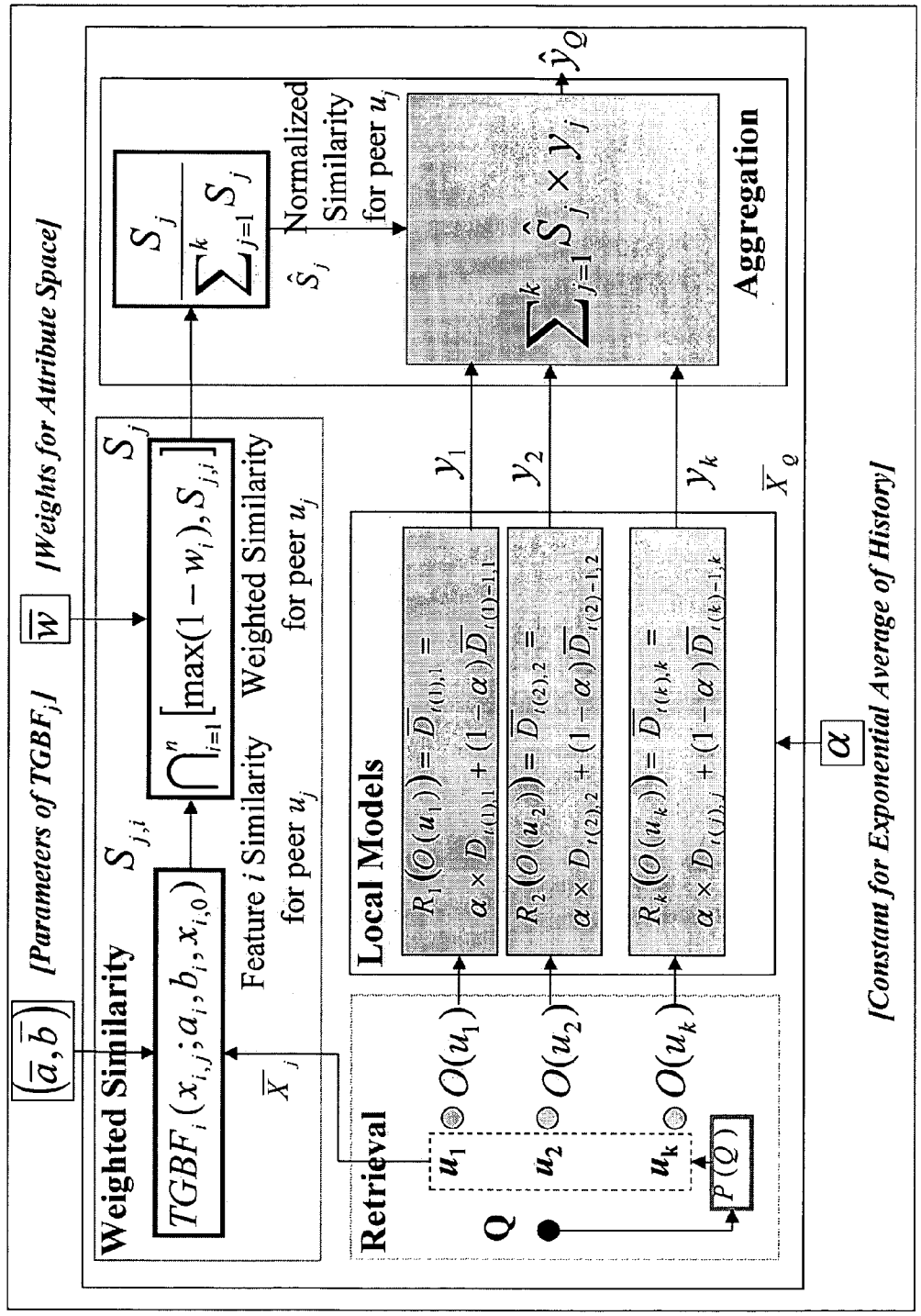
FIG. 5 is a diagram of a portion of the asset integrity engine and corresponding algebraic interpretations in exemplary embodiments.

A diagram of a portion of the asset integrity engine 500 and corresponding algebraic interpretations is shown in FIG. 5.

At step 212, the accuracy of the model outputs is evaluated. Given the role played by the weights $\{w_i\}$, search parameters $\{(a_i, b_i)\}$ and by exponent $\alpha$, it is desirable to create a methodology that could generate the best values according to selected metrics (e.g., classification precision). A primary performance metric may include the ability of a classifier to select the best units at any given time. Approaches used in defining the top units may include a fixed percentage approach or a fixed number approach. In addition, baselines calculated for measuring the increase in capability provided by the algorithms may include a random baseline (e.g., first baseline measured the expected performance if selection of the best N units were done randomly, a worse case scenario) and a heuristics baseline (e.g., a second baseline represents the best performance achieved by single or multiple heuristics which were used to rank the assets and pick the best N units).

Figure 6:
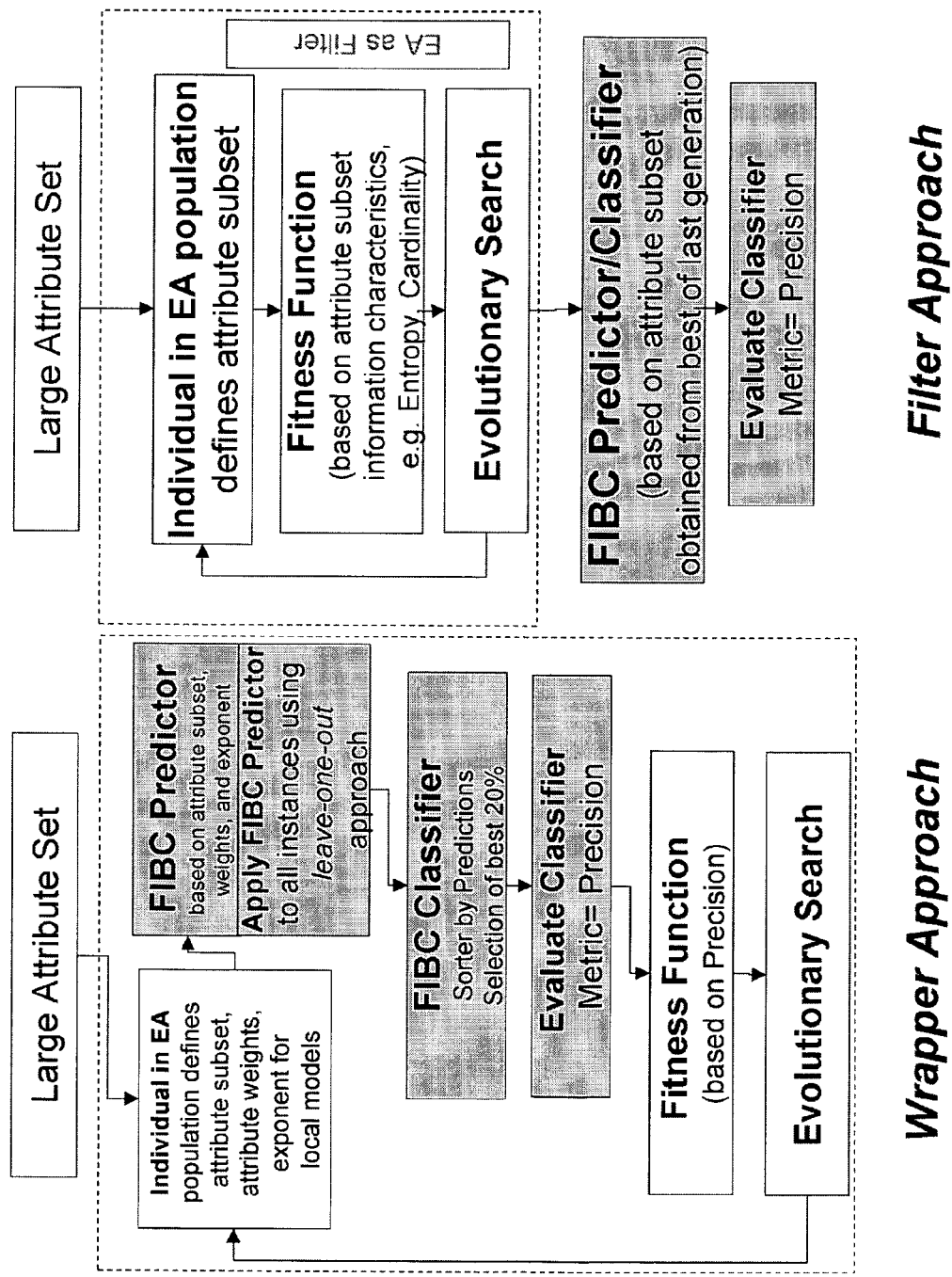
FIG. 6 is a flow diagram describing a process for computing a fitness function using a wrapper approach and a filter approach in exemplary embodiments.

Evolutionary search techniques may be employed to develop and maintain the fuzzy instance based classifier. Using a wrapper methodology or filter technique, evolutionary algorithms are defined for tuning the parameters of a classifier, as well as for tuning a structural search via attribute (feature) selection and weighting. A process for computing a fitness function using a wrapper approach and a filter approach is shown in FIG. 6. Note that it is also possible to use a fitness function that combines wrapper characteristics, e.g. best classifier's performance, with filter characteristics, e.g. parsimony in chromosome representation (least amount of required information).

At step 214, an evolutionary algorithm is performed using the results of the evaluation described in step 212. Evolutionary algorithms are composed of a population of individuals (e.g., chromosomes), each of which contains a vector of elements that represent distinct tunable parameters within the fuzzy instance based classifier configuration. Examples of tunable parameters may include the range of each parameter used to retrieve neighbor instances and the relative weights associated with each parameter used for similarity calculations.

Each chromosome specifies a vector of weights $[w_1, w_2, \ldots w_D]$ and defines an instance of the attribute, or feature, space used by its associated classifier. If $w_i \in \{0,1\}$, attribute selection is performed (i.e., a crisp subset of the universe of potential attributes is selected). If $w_i \in [0,1]$, attribute weighting is performed (i.e., a fuzzy subset of the universe of potential attributes is defined).

$$[w_1 w_2 \ldots w_D][(a_1,b_1),(a_2,b_2),\ldots,(a_D,b_D)][\alpha]$$

where $w_i \in [0,1]$ for attribute weighting or $w_i \in [0,1]$ for attribute selection D=Cardinality of universe of features U, D=|U|

$$d = \sum_i^D w_1$$

(fuzzy) cardinality of selected features ($a_i$, $b_i$)=Parameters for $TGBF_i$ and α=Parameter for Exponential Average Thus, the first part of the chromosome, containing the weights vector [$w_1$, $w_2$, ... $w_D$], defines the attribute space (e.g., the fuzzy instance based classifier structure), and the relevance of each attribute in evaluating similarity. The second part of the chromosome, containing the vector of pairs [($a_1$, $b_1$), ... ($a_i$, $b_i$), ... ($a_D$, $b_D$)] defines the parameter for the retrieval and similarity evaluation. The last part of the chromosome, containing the parameter α, defines the local model.

Figure 7:
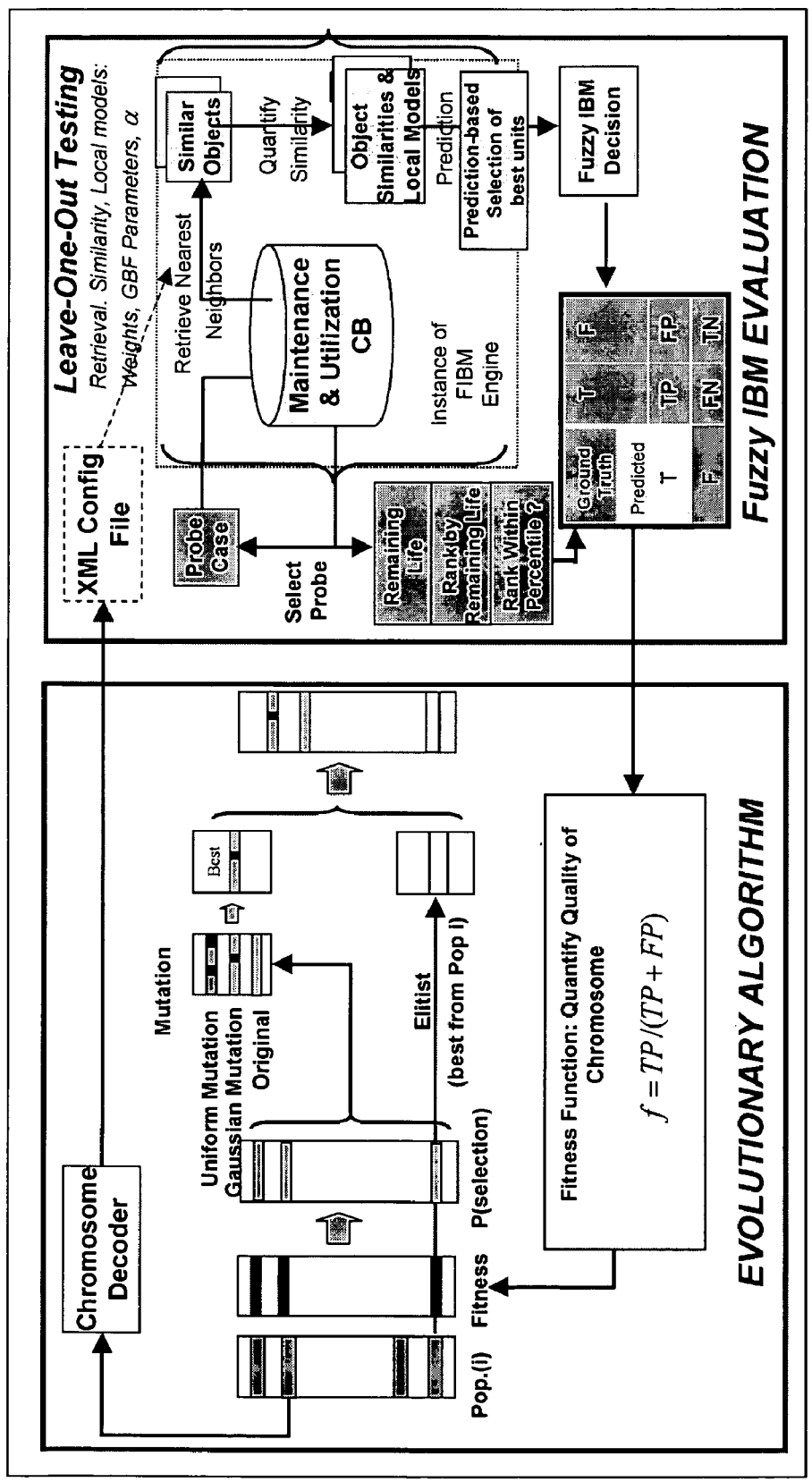
FIG. 7 is a diagram evolutionary architecture used in implementing evolutionary algorithms to tune the parameters of structural elements in exemplary embodiments.

The fitness function may be computed using the wrapper approach or filter technique of FIG. 6. For each chromosome, its corresponding fuzzy instance based classifier is instantiated. Following a leave-one-out approach, the fuzzy instance based classifier may be used to predict the expected life of the asset under question (e.g., using the formula represented in step 210). Steps 204-210 may be repeated for all assets. The results may be sorted in decreasing order (e.g., via the predicted duration $D_{next, Q}$. A top number or percentage of this sorted group (e.g., top 20%) may be selected. The fitness function of the chromosome represents the precision of the classification, or TP/(TP+FP), where TP=true positives (correct classifications) and FP=false positives (incorrect classifications). An evolutionary architecture used in implementing evolutionary algorithms to tune the parameters of structural elements, via attribute or feature selection and weighting is shown in FIG. 7.

Figure 8:
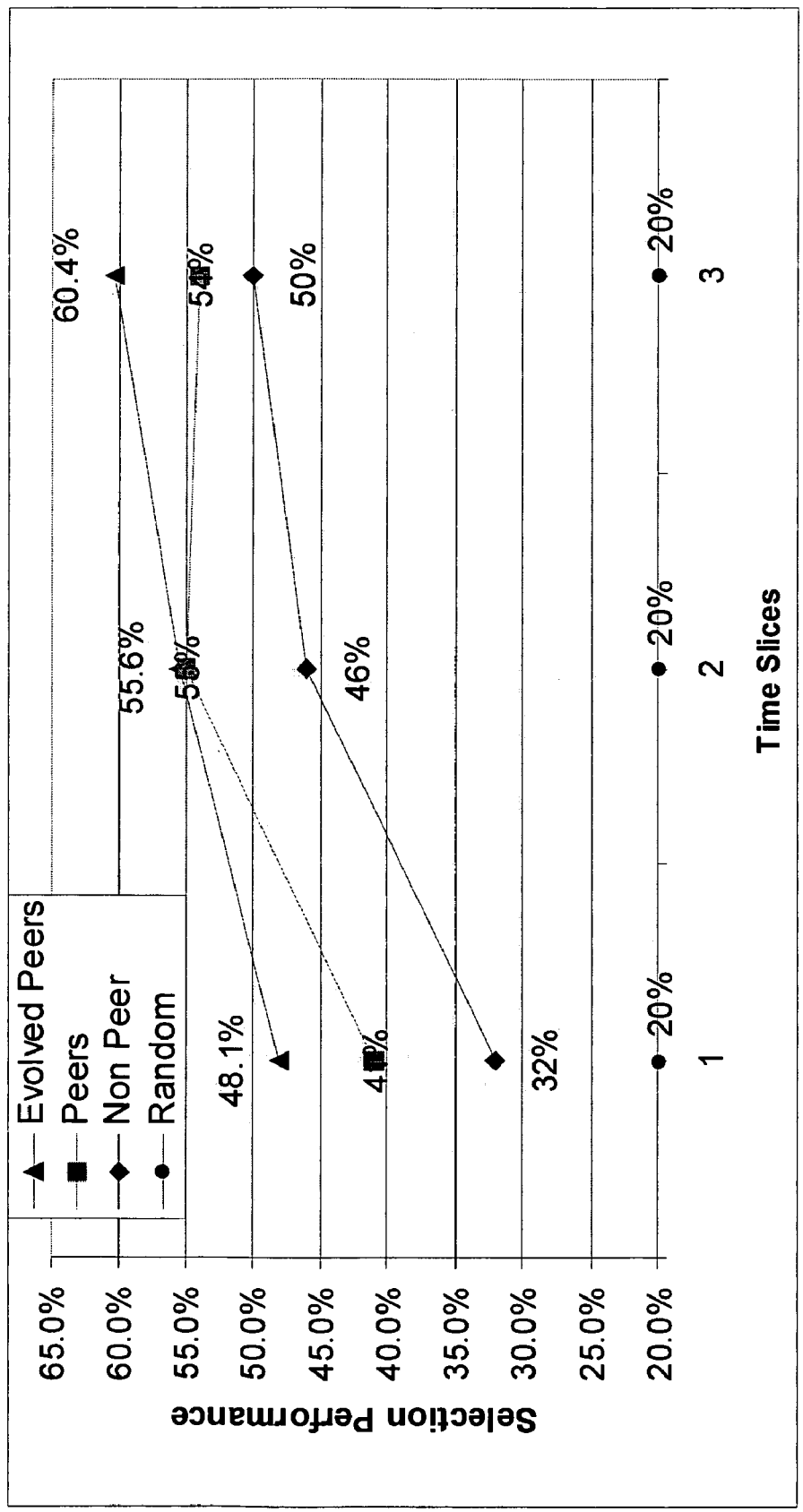
FIG. 8 is a graphical depiction of time-based performance results of peers generated via the asset integrity engine in exemplary embodiments.

A graphical depiction of time-based performance results 800 (three time-based data slices) of peers generated via the asset integrity engine is shown in FIG. 8. The data segmentation allows evaluation of the affects of environmental, operational, or maintenance changes on the model and its performance, as well as an understanding of how the incremental acquisition of data may improve the performance of the learning techniques employed in the evolutionary process.

As described above, asset reliability forecasting processes provides a fuzzy peer-based approach for performance modeling combined with an evolutionary framework for model maintenance. The asset reliability forecasting processes provide the ability to select the most reliable units, or assets, within a group of assets.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of forecasting remaining useful life of an asset, comprising:

identifying peer units of the asset from a set of potential peer units by using selected criteria and performing a search for the peer units based upon the selected criteria;

using a first evolutionary algorithm for processing a defined degree of closeness between said peer units and said asset;

constructing local predictive models using the peer units;

estimating the remaining useful life of the asset based upon the local predictive models; and updating the local predictive models to reflect at least one change in the criteria using a second evolutionary algorithm.

2. The method of claim 1, wherein the selected criteria includes:

attributes;

search parameters; and similarity function.

3. The method of claim 2, wherein the attributes include structural features and characteristics of the asset.

4. The method of claim 2, wherein the search parameters include a spread and slope of a distribution of attribute values returned from the search.

5. The method of claim 2, wherein the defined degree of closeness includes applying weights to the selected attributes.

6. The method of claim 2, wherein the attributes include at least one of:

operational data relating to the asset;

maintenance data relating to the asset; and environmental data relating to the asset.

7. The method of claim 1, wherein the first and second evolutionary algorithm is defined using at least one of a:

filter; and wrapper.

8. The method of claim 1, wherein updating the local predictive models is performed for selected time frames.

9. The method of claim 1, wherein constructing local predictive models further comprises normalizing and aggregating a set of model outputs.

10. The method of claim 1, further comprising defining one or more best assets according to selected metrics, wherein said selected metrics are selected from at least one of a fixed percentage approach and a fixed number approach.

11. The method of claim 1, further comprising evaluating accuracy of said local predictive models over time and updating the local predictive models based upon said accuracy.

12. A system for estimating remaining useful life of an asset, comprising:

a host system;

a storage device in communication with the host system, the storage device storing asset data with utilization information and maintenance data; and an asset integrity engine executing on the host system, performing:

identifying peer units of the asset from a set of potential peer units by using selected criteria and performing a search of the storage device for the peer units based upon the selected criteria;

using a first evolutionary algorithm for defining a degree of closeness between said peer units and said asset;

constructing local predictive models using the peer units;

estimating the remaining useful life of the asset based upon the local predictive models; and updating the local predictive models to reflect at least one change in the criteria using a second evolutionary algorithm.

13. The system of claim 12 wherein the selected criteria includes:
   attributes;
   search parameters; and
   similarity function.

14. The system of claim 13, wherein the attributes include structural features and characteristics of the asset.

15. The system of claim 13, wherein the search parameters include a spread and slope of a distribution of attribute values returned from the search.

16. The system of claim 13, wherein the similarity function includes a defined degree of closeness between the asset and potential peer units, the defined degree of closeness including applying weights to the selected attributes for refining computation of the similarity function.

17. The system of claim 13, wherein the attributes include at least one of:
   operational data relating to the asset;
   maintenance data relating to the asset; and
   environmental data relating to the asset.

18. The system of claim 12, wherein the first and second evolutionary algorithm is defined using at least one of a:
   filter; and
   wrapper.

19. The system of claim 12, wherein updating the local predictive models is performed for selected time frames.

20. The system of claim 12, wherein one or more best assets are determined according to a fixed percentage approach or a fixed number approach.

* * * * *

UNITED STATES PATENT AND TRADEMARK OFFICE
CERTIFICATE OF CORRECTION

PATENT NO.       : 7,509,235 B2                                    Page 1 of 1
APPLICATION NO.  : 11/216940
DATED            : March 24, 2009
INVENTOR(S)      : Bonissone et al.

It is certified that error appears in the above-identified patent and that said Letters Patent is hereby corrected as shown below:

In Fig. 4, Sheet 4 of 8, delete " if $GBF > 10^5$ " and insert -- if $GBF > 10^{-5}$ --, therefor.

In Fig. 4, Sheet 4 of 8, delete "Slate" and insert -- State --, therefor.

Signed and Sealed this

Thirtieth Day of November, 2010

David J. Kappos
*Director of the United States Patent and Trademark Office*